United States Patent
Brown et al.

(10) Patent No.: US 9,828,276 B2
(45) Date of Patent: Nov. 28, 2017

(54) GLASS RIBBON BREAKING DEVICES AND METHODS OF PRODUCING GLASS SHEETS

(71) Applicant: Corning Incorporated, Corning, NY (US)

(72) Inventors: James William Brown, Painted Post, NY (US); Marvin William Kemmerer, Odessa, NY (US); Jonathan Michael Mis, Horseheads, NY (US); Dean George Sakona, Corning, NY (US); Zheming Zheng, Horseheads, NY (US); Naiyue Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/900,720

(22) PCT Filed: Jun. 24, 2014

(86) PCT No.: PCT/US2014/043752
§ 371 (c)(1),
(2) Date: Dec. 22, 2015

(87) PCT Pub. No.: WO2014/209926
PCT Pub. Date: Dec. 31, 2014

(65) Prior Publication Data
US 2016/0152507 A1    Jun. 2, 2016

Related U.S. Application Data

(60) Provisional application No. 61/839,423, filed on Jun. 26, 2013.

(51) Int. Cl.
C03B 33/02    (2006.01)
C03B 17/06    (2006.01)
(Continued)

(52) U.S. Cl.
CPC ........ *C03B 33/0215* (2013.01); *B25B 11/005* (2013.01); *C03B 17/064* (2013.01);
(Continued)

(58) Field of Classification Search
CPC ...................................................... B65G 49/06
See application file for complete search history.

(56) References Cited

U.S. PATENT DOCUMENTS

| | | |
|---|---|---|
| 2,943,393 A | 7/1960 | Insolio |
| 3,338,696 A | 8/1967 | Dockerty |

(Continued)

FOREIGN PATENT DOCUMENTS

KR    2011046374 A    5/2011

OTHER PUBLICATIONS

Patent Cooperation Treaty, International Search Report. dated Jun. 24, 2014. pp. 1-10.

*Primary Examiner* — Cynthia Szewczyk
(74) *Attorney, Agent, or Firm* — Matthew J. Mason

(57) ABSTRACT

Methods of producing a glass sheet each comprise the step of creating a vacuum to force the entire lateral portion of the glass ribbon to engage an anvil portion of a breaking device in the elastic zone. The vacuum is provided by a plurality of pressure zones that are operated independent from one another, wherein each pressure zone is provided with a set of suction cups. In further examples, glass ribbon breaking devices each include a plurality of pressure zones that are configured to be operated independent from one another with each pressure zone being provided with set of suction cups.

23 Claims, 11 Drawing Sheets

(51) Int. Cl.
   *C03B 33/033*  (2006.01)
   *B25B 11/00*   (2006.01)
   *C03B 33/04*   (2006.01)

(52) U.S. Cl.
   CPC ............ *C03B 33/033* (2013.01); *C03B 33/04* (2013.01); *B65G 2249/045* (2013.01); *Y02P 40/57* (2015.11)

(56) References Cited

U.S. PATENT DOCUMENTS

| | | |
|---|---|---|
| 3,682,609 A | 8/1972 | Dockerty |
| 4,511,387 A | 4/1985 | Kellar et al. |
| 5,165,585 A | 11/1992 | Lisec |
| 5,873,922 A | 2/1999 | Lisec |
| 6,616,025 B1 | 9/2003 | Lavage, Jr. |
| 6,774,978 B2 | 8/2004 | Shin |
| 7,204,400 B2 | 4/2007 | Marek et al. |
| 7,895,861 B2 | 3/2011 | Chalk et al. |
| 8,053,704 B2 | 11/2011 | Abramov et al. |
| 8,146,385 B2 | 4/2012 | Delia et al. |
| 8,245,539 B2 | 8/2012 | Lu et al. |
| 8,292,141 B2 | 10/2012 | Cox et al. |
| 2004/0211218 A1 | 10/2004 | Jotaki |
| 2005/0103055 A1 | 5/2005 | Gfeller et al. |
| 2006/0042314 A1 | 3/2006 | Abbott, III et al. |
| 2006/0249553 A1 | 11/2006 | Ukrainczyk |
| 2006/0261118 A1 | 11/2006 | Cox et al. |
| 2007/0039990 A1 | 2/2007 | Kemmerer et al. |
| 2007/0095108 A1* | 5/2007 | Kirby .................. C03B 17/068 65/475 |
| 2008/0131651 A1 | 6/2008 | Burdette et al. |
| 2008/0264994 A1 | 10/2008 | Herve et al. |
| 2008/0276646 A1 | 11/2008 | Chalk et al. |
| 2008/0276785 A1 | 11/2008 | Dahroug et al. |
| 2009/0250497 A1 | 10/2009 | Cox et al. |
| 2011/0094267 A1 | 4/2011 | Aniolek et al. |
| 2011/0126593 A1 | 6/2011 | Abdul-Rahman et al. |
| 2011/0277507 A1 | 11/2011 | Lu et al. |
| 2012/0103018 A1 | 5/2012 | Lu et al. |
| 2012/0193500 A1* | 8/2012 | Kniss .................. B25B 11/007 248/363 |

* cited by examiner

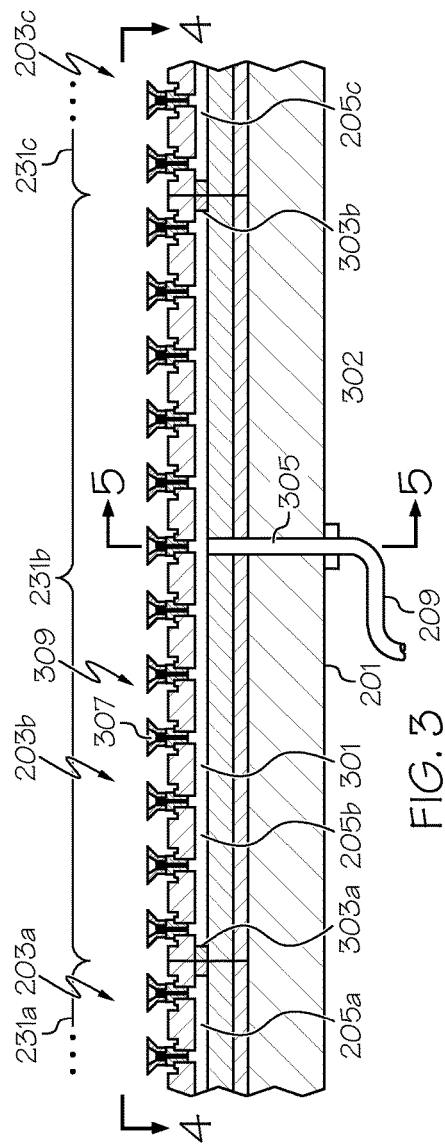
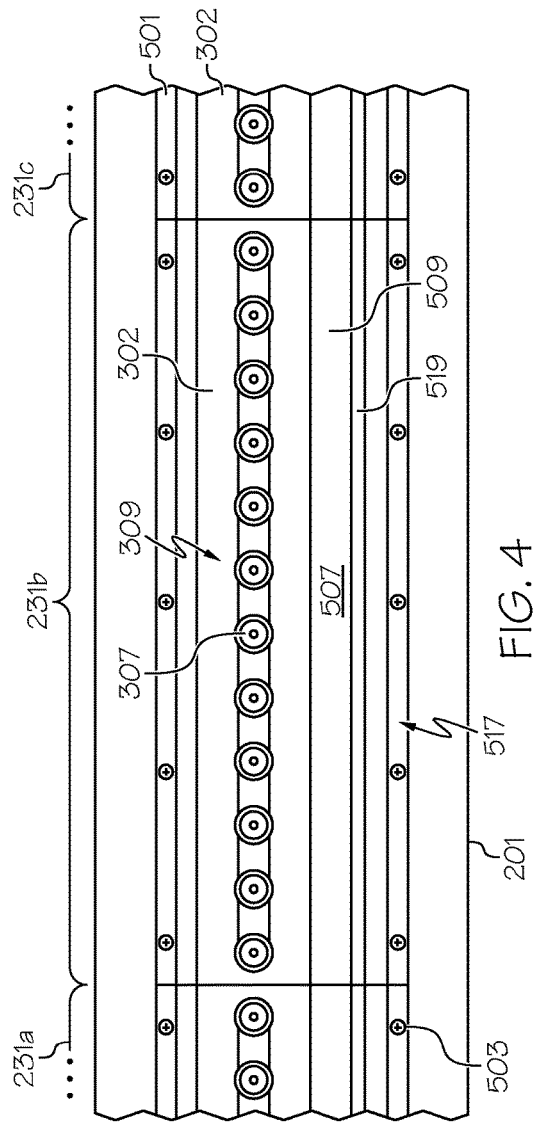

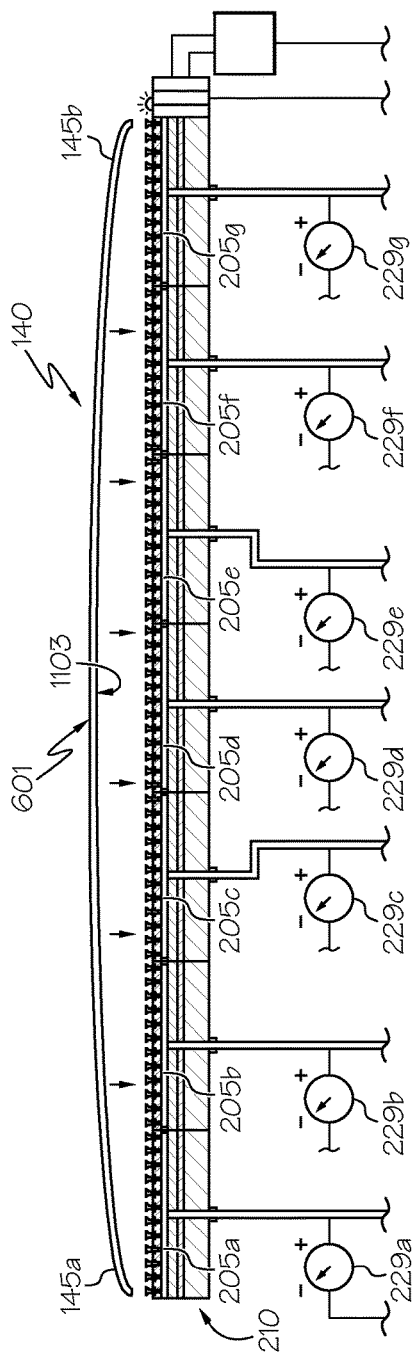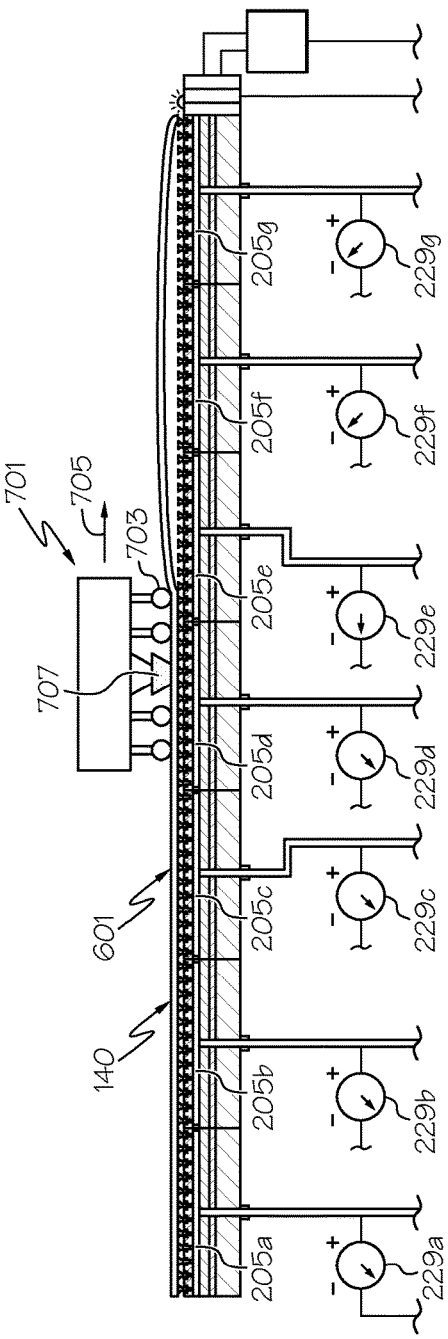

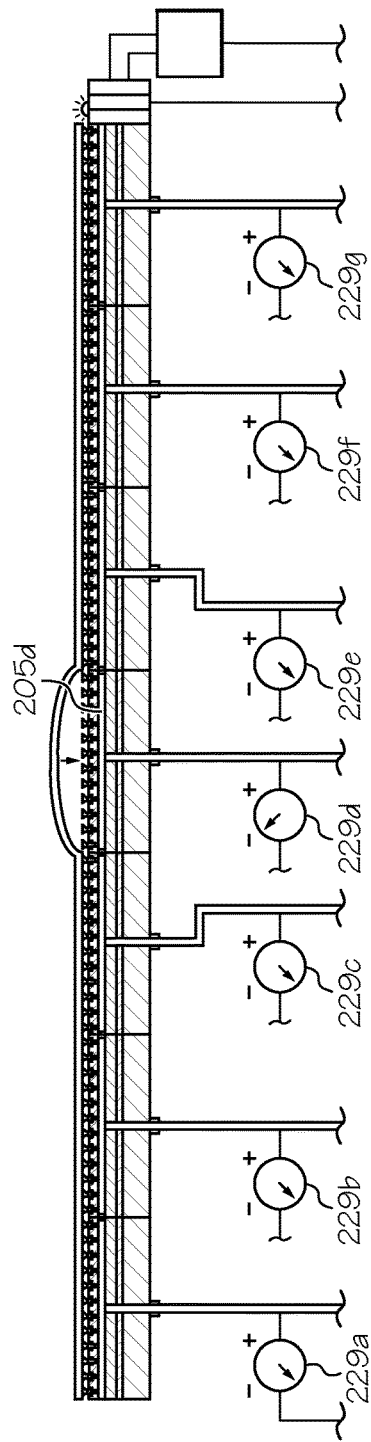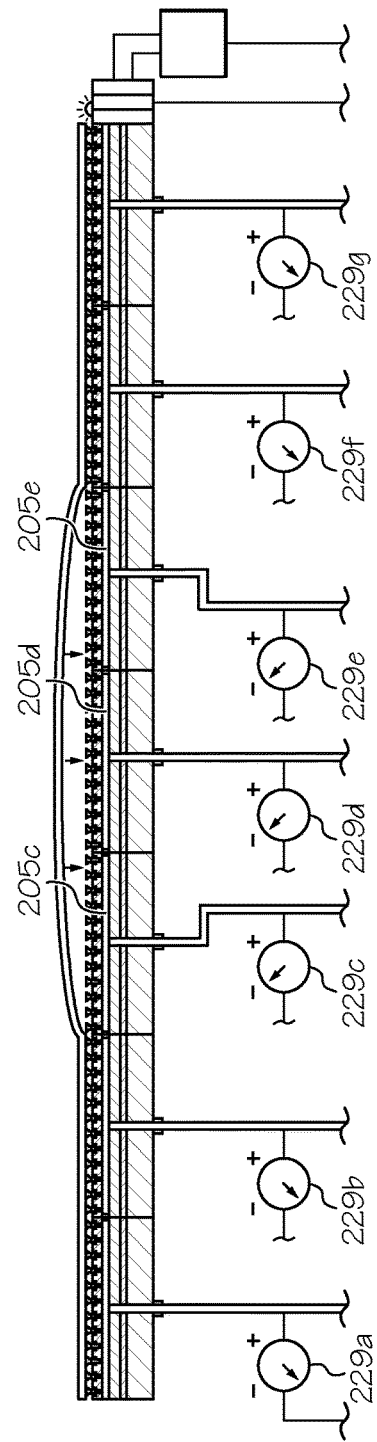
FIG. 17
FIG. 18

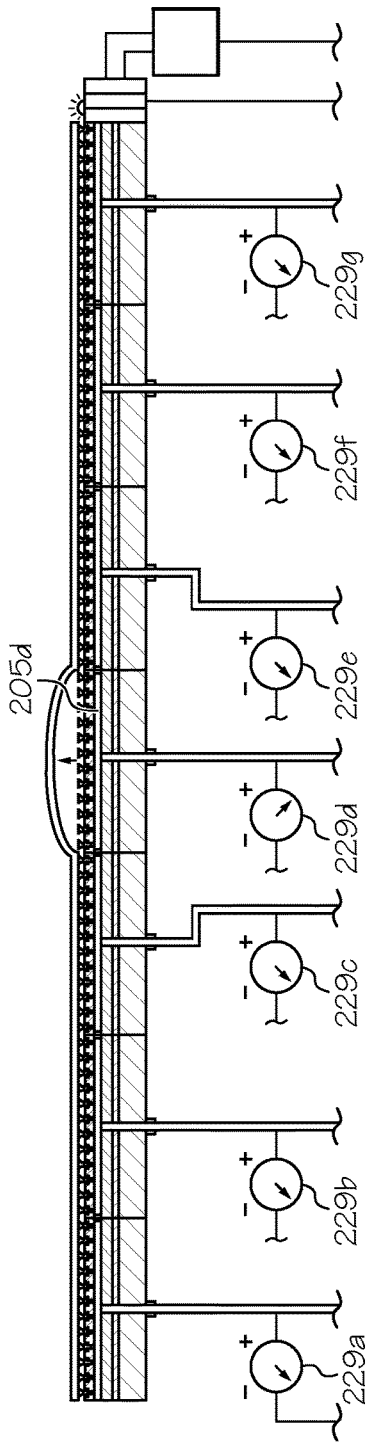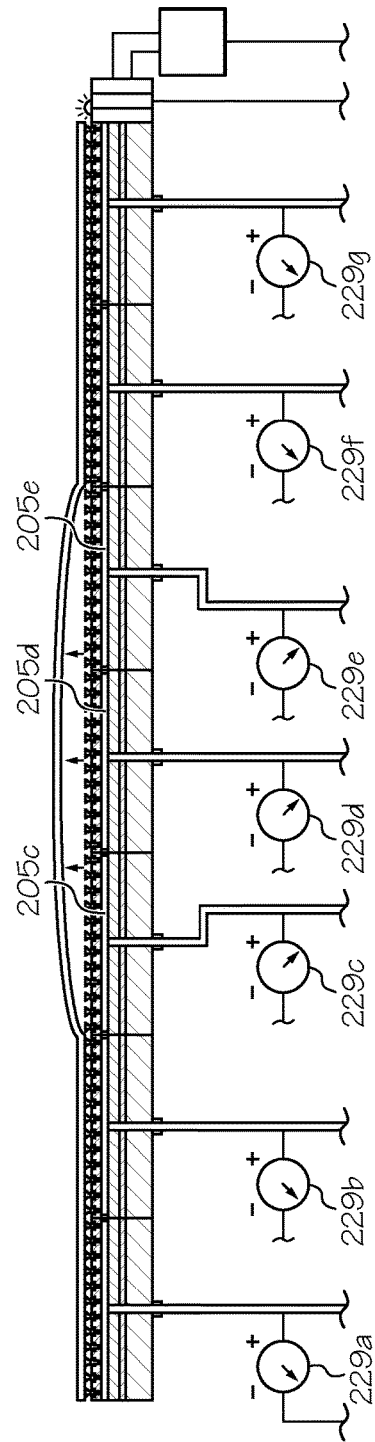

GLASS RIBBON BREAKING DEVICES AND METHODS OF PRODUCING GLASS SHEETS

CROSS-REFERENCE TO RELATED APPLICATIONS

This application claims the benefit of priority under 35 U.S.C. §371 of International Patent Application Serial No. PCT/US14/43752 filed on Jun. 24, 2014, which claims the benefit of priority to U.S. Application Ser. No. 61/839,423 filed on Jun. 26, 2013 the content of each is relied upon and incorporated herein by reference in their entirety.

TECHNICAL FIELD

The present invention relates generally to glass ribbon breaking devices and methods for producing glass sheets and, more particularly, to glass ribbon breaking devices with a plurality of pressure zones that each include a set of suction cups and methods of producing glass sheets by fusion drawing a glass ribbon from a root of a forming wedge.

BACKGROUND

Methods of manufacturing glass sheets are known to include the step of fusion drawing a glass ribbon from the root of a forming wedge. Once drawn from the root, the glass ribbon is set from a viscous state to an elastic state. After reaching the elastic state, the end portion of the glass ribbon is then periodically cut to provide a glass sheet having the desired length.

SUMMARY

The following presents a simplified summary of the disclosure in order to provide a basic understanding of some example aspects described in the detailed description.

In a first example aspect, a method of producing a glass sheet comprises the step of fusion drawing a glass ribbon along a draw direction into a viscous zone downstream from a root of a forming wedge. The glass ribbon includes opposed edges and a lateral portion extending between the opposed edges along a lateral direction transverse to the draw direction. The method further includes the step of drawing the glass ribbon into a setting zone downstream from the viscous zone, wherein the glass ribbon is set from a viscous state to an elastic state and the step of drawing the glass ribbon into an elastic zone downstream from the setting zone. The method also includes the step of creating a vacuum to force the entire lateral portion of the glass ribbon to engage an anvil portion of a breaking device in the elastic zone. The vacuum is provided by a plurality of pressure zones that are operated independent from one another, wherein each pressure zone is provided with a set of suction cups. A suction area of each suction cup is in fluid communication with the corresponding pressure zone. The method still further includes the step of forming a score line along the lateral portion of the glass ribbon in the elastic zone and step of breaking away a glass sheet from the glass ribbon along the score line while the entire lateral portion is forced against the anvil portion by the vacuum.

In one example of the first aspect, the plurality of pressure zones includes at least one central pressure zone straddled by at least one pair of side pressure zones. After the step of breaking away the glass sheet, the vacuum force from the central pressure zone is reduced to begin releasing a central area of the lateral portion before the pair of side pressure zones begins releasing side areas of the lateral portion.

In another example of the first aspect, after the step of breaking away the glass sheet, a positive pressure is applied by the central pressure zone to force the central area away from the anvil portion.

In still another example of the first aspect, the positive pressure is applied by the central pressure zone while the vacuum is maintained by the pair of side pressure zones.

In another example of the first aspect, the plurality of pressure zones are adjusted independently as the glass ribbon engages the anvil portion. For instance, in one example, the plurality of pressure zones are adjusted sequentially as the glass ribbon engages the anvil portion.

In a further example of the first aspect, the method further comprises the steps of setting the glass ribbon with a nonlinear profile in the lateral direction, and using a pressing device to flatten out the lateral portion of the glass ribbon against the anvil portion, wherein the vacuum thereafter prevents the glass ribbon from returning to the nonlinear profile before breaking away the glass sheet from the glass ribbon.

In yet a further example of the first aspect, wherein the step of forming the score line is initiated before the entire lateral portion of the glass ribbon engages the anvil portion.

In another example of the first aspect, the method further comprises the step of setting the glass ribbon with a substantially curved cross-sectional profile in the lateral direction.

In still another example of the first aspect, the vacuum holds the lateral portion of the glass ribbon along a substantially straight cross-sectional profile against the anvil portion prior to breaking away the glass sheet from the glass ribbon along the score line.

In yet another example of the first aspect, the breaking device comprises a traveling anvil machine wherein the anvil portion moves together with the lateral portion in the draw direction while maintaining the vacuum.

In a further example of the first aspect, the method also includes the step of monitoring a condition of the pressure zones, and performing maintenance on the breaking device based on the monitored condition.

In yet a further example of the first aspect, during the step of creating the vacuum, a portion of each suction cup collapses such that an engagement surface of the suction cup is coplanar with an engagement surface of the anvil portion. For example, during the step of creating the vacuum, the portion of each suction cup collapses such that the engagement surface of the suction cup retracts a distance within a range of about 0.5 mm to about 1 mm to be coplanar with the engagement surface of the anvil portion.

The first example aspect may be carried out alone or with any example or any combination of examples of the first aspect discussed above.

In a second example aspect, a method of producing a glass sheet comprises the step of fusion drawing a glass ribbon along a draw direction into a viscous zone downstream from a root of a forming wedge, wherein the glass ribbon includes opposed edges and a lateral portion extending between the opposed edges along a lateral direction transverse to the draw direction. The method also includes the step of drawing the glass ribbon into a setting zone downstream from the viscous zone, wherein the glass ribbon is set from a viscous state to an elastic state. The method further includes the step of drawing the glass ribbon into an elastic zone downstream from the setting zone, wherein the lateral portion of the glass ribbon includes a profile shape along the lateral direction comprising a set profile shape. The method still further includes the step of creating a vacuum to force the entire lateral portion of the glass ribbon to engage an anvil portion of a breaking device in the elastic zone, wherein the glass ribbon is held such that the profile shape of the lateral portion of the glass ribbon comprises an engaged profile shape that substantially matches a shape of the anvil portion and is substantially different than the set profile shape. The vacuum is provided by a plurality of pressure zones that are operated independent from one another. Each pressure zone is provided with a set of suction cups, and a suction area of each suction cup is in fluid communication with the corresponding pressure zone. The method further includes the step of forming a score line along the lateral portion of the glass ribbon and breaking away a glass sheet from the glass ribbon along the score line while the entire lateral portion is forced against the anvil portion by the vacuum. The method then includes the step of releasing the glass sheet from the anvil portion such that the profile shape of the glass ribbon does not match the engaged profile shape.

In one example of the second aspect, during the step of creating the vacuum, a portion of each suction cup collapses such that an engagement surface of the suction cup is coplanar with an engagement surface of the anvil portion. For example, during the step of creating the vacuum, the portion of each suction cup collapses such that the engagement surface of the suction cup retracts a distance within a range of about 0.5 mm to about 1 mm to be coplanar with the engagement surface of the anvil portion.

The second example aspect may be carried out alone or with any example or any combination of examples of the second aspect discussed above.

In a third example aspect, a glass ribbon breaking device comprises an anvil portion including an engagement surface configured to engage a major face of the glass ribbon and a plurality of pressure zones that are configured to be operated independent from one another. Each pressure zone is provided with a set of suction cups, wherein a suction area of each suction cup is in fluid communication with the corresponding pressure zone. The suction cups are configured to engage a surface of the glass ribbon with the suction area of each suction cup being at least partially evacuated by operation of the corresponding pressure zones to draw the glass ribbon against the anvil portion.

In one example of the third aspect, the anvil portion comprises a resilient material.

In another example of the third aspect, a portion of each suction cup extends beyond the engagement surface of the anvil portion. For example, an engagement surface of the suction cup extends a distance within a range of about 0.5 mm to about 1 mm beyond the engagement surface of the anvil portion.

In still another example of the third aspect, the portion of each suction cup is configured to collapse such that an engagement surface of the suction cup is coplanar with the engagement surface of the anvil portion. For example the portion of each suction cup is configured to collapse such that the engagement surface of the suction cup retracts a distance within a range of about 0.5 mm to about 1 mm to be coplanar with the engagement surface of the anvil portion.

The third example aspect may be carried out alone or with any example or any combination of examples of the third aspect discussed above.

BRIEF DESCRIPTION OF THE DRAWINGS

These and other aspects are better understood when the following detailed description is read with reference to the accompanying drawings, in which:

FIG. 3 is an enlarged view of portions of the breaking device illustrated in FIG. 2;

FIG. 4 is a schematic front view along line 4-4 of FIG. 3;

FIG. 6 is a schematic view of the breaking device of FIG. 2 being placed with respect to a lateral portion of a glass ribbon;

FIG. 7 is a schematic view of the lateral portion of the glass ribbon of FIG. 6 being flattened out with a pressing device;

FIG. 17 is a schematic view, similar to FIG. 8 illustrating an example of the vacuum force from a central pressure zone being reduced to begin releasing a central area of the lateral portion before a pair of side pressure zones begins releasing side areas of the lateral portion;

FIG. 18 is a schematic view, similar to FIG. 17 illustrating the vacuum force of outer pairs of pressure zones being sequentially reduced while releasing the lateral portion from the anvil portion;

FIG. 19 is a schematic view, similar to FIG. 8 illustrating another example of the vacuum force from a central pressure zone being reduced to begin releasing a central area of the lateral portion before a pair of side pressure zones begins releasing side areas of the lateral portion; and FIG. 20 is a schematic view, similar to FIG. 19 illustrating the vacuum force of outer pairs of pressure zones being sequentially reduced while releasing the lateral portion from the anvil portion.

DETAILED DESCRIPTION

Figure 1:
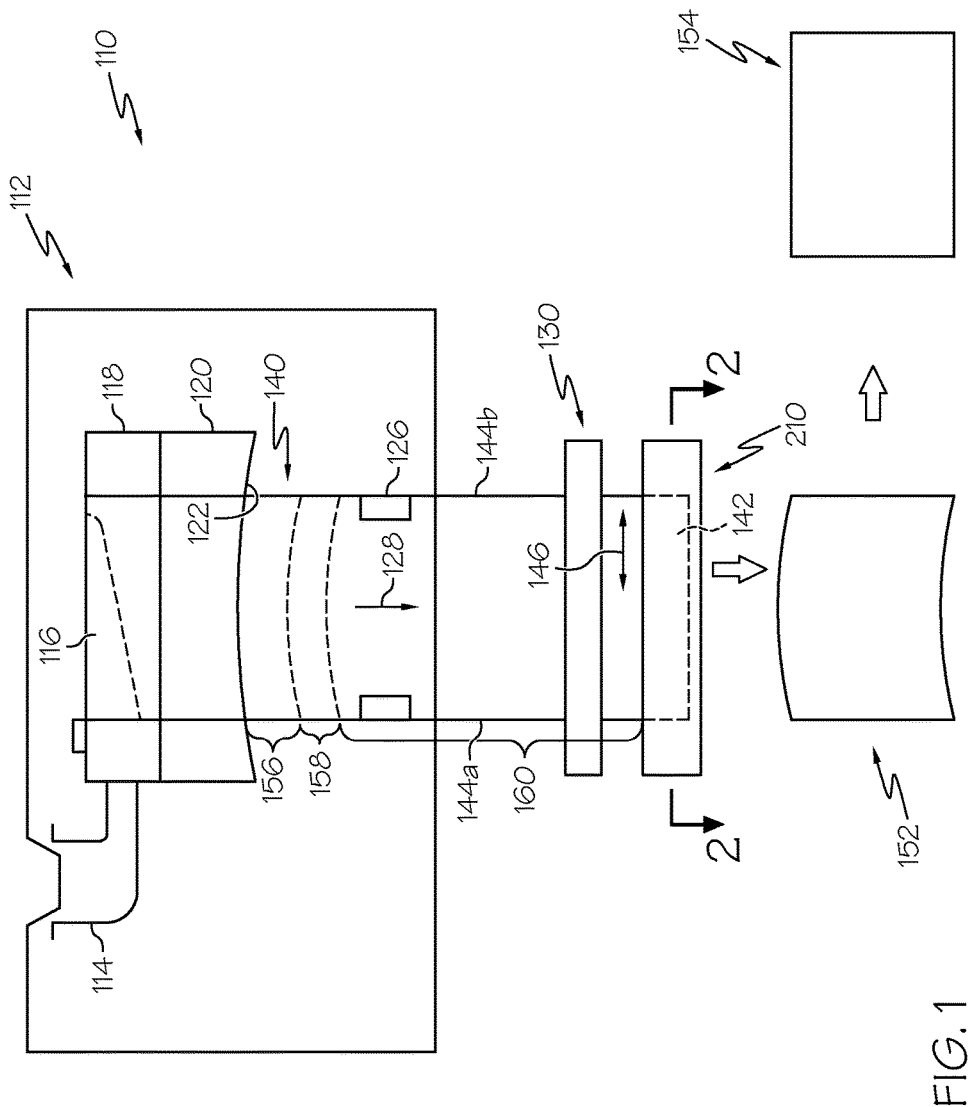
FIG. 1 is a schematic view of an example fusion drawing apparatus being used to produce a glass sheet.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Methods herein can be incorporated with various fusion drawing apparatus designed to be used to fusion draw glass ribbon. The fusion drawing apparatus can include features disclosed in U.S. Pat. App. Pub. No. 2008/0131651 and U.S. Pat. Nos. 3,338,696, 3,682,609 and 8,245,539 that are herein incorporated by reference in their entirety.

One example fusion drawing apparatus 110 is illustrated schematically in FIG. 1. As shown, the fusion drawing apparatus 110 can include a fusion draw machine 112 configured to receive molten glass through an inlet 114 to be received in a trough 116 of a forming vessel 118. The forming vessel 118 can be provided with a forming wedge 120 configured to facilitate fusion drawing a glass ribbon 140 from a root 122 of the forming wedge 120 as discussed more fully below. A pull roll assembly 126 can facilitate pulling of the glass ribbon 140 in a draw direction 128. The fusion drawing apparatus 110 may optionally include a stabilization device 130. For example, the stabilization device 130 may include pressure members with a plurality of pressure nozzles that are positioned on each side of the glass ribbon. The pressure nozzles can act together to provide a desired varying pressure profile along the width of the glass ribbon as described more fully in U.S. patent application Ser. No. 12/607,474 filed Oct. 28, 2009 that is herein incorporated by reference in its entirety.

The fusion drawing apparatus 110 may further include a breaking device 210 schematically illustrated in FIG. 1. If provided, the stabilization device 130 may be positioned upstream from the breaking device 210. As discussed more fully below, the breaking device 210 is configured to break away a glass sheet 152 from the glass ribbon 140. The glass sheet 152 may be subdivided into individual display glass sheets 154 for incorporating in the various display devices, such as a liquid crystal display (LCD).

The breaking device 210 can comprise a stationary breaking device or a traveling breaking device. For example, as shown, the breaking device 210 comprises a traveling anvil machine that may move in the draw direction 128 during the process of scoring the glass ribbon and subsequently breaking the glass sheet 152 from the glass ribbon 140.

Figure 2:
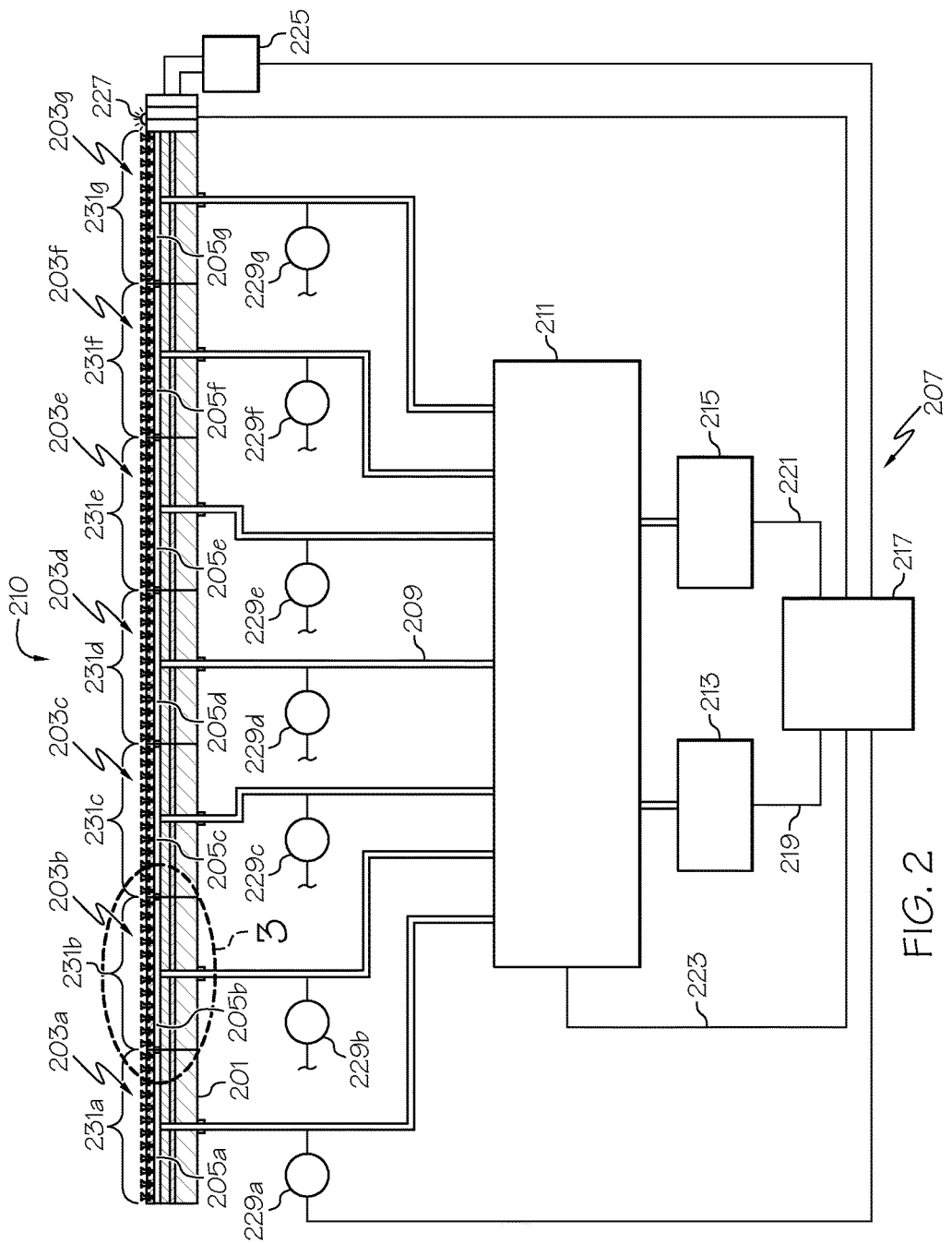
FIG. 2 is a schematic cross sectional view along line 2-2 of FIG. 1, schematically illustrating features of an example breaking device.

FIG. 2 illustrates a schematic cross sectional view of the breaking device 210 along line 2-2 of FIG. 1. As shown in FIG. 2, the breaking device 210 can include a support base 201 for mounting a plurality of nosing members 203a-g. Although seven nosing members 203a-g are provided, in further examples, more or less than seven nosing members may be provided depending on the particular application. Each pressure zone can have substantially the same length although different lengths may be provided in further examples. The lengths may be provided depending on the particular application. In one example, seven identical nosing members 203a-g may be provided that each have a length of approximately 260 mm although different lengths may be provided in further examples.

The nosing members 203a-g include a plurality of pressure zones 205a-g that are configured to be operated independent from one another. For example, the breaking device 210 may include a fluid control apparatus 207 configured to provide independent operation of the plurality of pressure zones 205a-g. In the illustrated example, a fluid conduit 209 may provide fluid communication between each of the plurality of pressure zones 205a-g and a fluid control manifold 211. The fluid control manifold 211 is configured to selectively place each fluid conduit 209 in communication with at least one of a positive pressure source 213 and a negative pressure source 215.

A computer controller 217 may transmit commands along a transmission line 219 to control the positive pressure source 213. For example, the positive pressure source 213 may be a pressure pump wherein the computer controller 217 can send commands along a transmission line 219 to control operation of the pressure pump. Likewise, the computer controller 217 may transmit commands along another transmission line 221 to control the negative pressure source 215. For example, the negative pressure source 215 may comprise a vacuum pump wherein the computer controller 217 can send commands along the transmission line 221 to control operation of the vacuum pump. Still further, the computer controller 217 may also send signals along transmission line 223 to control operation of the fluid control manifold 211 depending on the desired pressure profile. In one example, the fluid control manifold 211 can cause at least one or all of the pressure zones 205a-g to be placed in fluid communication with the positive pressure source 213 and/or the negative pressure source 215. Therefore, it is possible for each of the pressure zones 205a-g to be operated independent from one another to selectively act as either a fluid emitting port or a fluid vacuum port, at a selected pressure, depending on the process parameters.

Placement of the breaking device 210 can be achieved by way of an actuator 225. Indeed, the computer controller 217 can operate the actuator 225 to appropriately position the breaking device 210 with respect to a major surface of the glass ribbon 140. One or more optional proximity sensors 227 may be arranged to provide feedback to the computer controller 217 to facilitate automatic positioning of the breaking device 210 with respect to the glass ribbon 140. Although a single proximity sensor is shown, a plurality of proximity sensors may be provided.

Each of the pressure zones 205a-g may be provided with a respective pressure sensor 229a-g that may each send feedback to the computer controller 217 to facilitate automatic adjustment of the pressure of each pressure zone 205a-g to the desired preselected pressure by way of the fluid control manifold 217 as discussed more fully below.

Each pressure zone 205a-g is provided with a set of suction cups 231a-g, and wherein a suction area of each suction cup is in fluid communication with the corresponding pressure zone to allow operation of each set of suction cups 231a-g independent from one another. FIG. 3 is an enlarged portion of the breaking device 210 illustrating schematic features of each of the nosing members 203a-g wherein FIG. 4 is a corresponding front view of the breaking device 210 along line 4-4 of FIG. 3.

Figure 10:
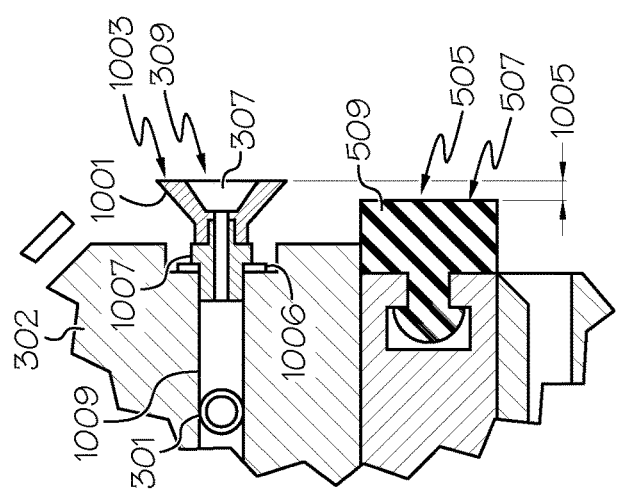
FIG. 10 is an enlarged schematic cross sectional view of a portion of the anvil portion schematically illustrated in FIG. 5.

FIGS. 3 and 4 illustrate features of the second nosing member 203b with the understanding that identical features may apply to the other nosing members. The pressure zones 205a-g may be provided by a through bore 301 extending through a suction cup support member 302 that is capped at each end by end caps 303a, 303b such that the through bores 301 of the nosing members 203a-g are not in fluid communication with one another. Each pressure zone 205a-g can be placed in fluid communication with its own fluid conduit 209 by way of a fluid passage 305. A suction area 307 of each suction cup 309 may be placed in fluid communication with the corresponding pressure zone 205a-g. For example, as shown in FIG. 10, each suction cup 309 can include a coupling 1007 threadably connected to a suction cup bore 1009 of the suction cup support member 302 to place the suction area 307 in fluid communication with the through bore 301.

As shown in FIGS. 3 and 4, each set of suction cups (e.g., 231b) can include 12 suction cups 309 although more or less suction cups may be provided in further examples. As such, the illustrated example includes a total of 84 suction cups are provided that are grouped in seven sets of suction cups 231a-g. Each set of suction cups may be placed in fluid communication with the corresponding pressure zone to allow each set of suction cups to operate independently from the other sets of suction cups for better vacuum cup engagement and release process steps.

Although 12 suction cups 309 per set are illustrated, more suction cups may be provided in further examples to increase the contact area and therefore more securely grip the glass ribbon and for securely force the glass ribbon against the anvil portion. However, more contact with the glass generally increases the surface damage to the engaged portions of the glass ribbon. As such, further examples may provide less than 12 suction cups per set to reduce contact with the glass ribbon and therefore avoid unnecessary damage to the surface of the glass ribbon. For the reasons set forth above, there may be some desire to reduce the number of suction cups or increase the number of suction cups to optimize the nosing device depending on the particular application.

In some examples, a selected number of the suction cups may be quickly removed from the suction cup support member 302 by the threaded coupling 1007. A threaded plug may be threadably inserted in place of the suction cup to prevent fluid flow through the corresponding suction cup bore 1009 and therefore allow appropriate operation of the remaining suction cups of the set of suction cups. As such, each pressure zone 205a-g may be provided with a unique number and/or arrangement of suction cups to accommodate the desired pressure profile. Furthermore, outer suction cups may be removed and plugged to accommodate procedures involving glass ribbons having a reduced width. In some examples, all the suction cups 309 of the breaking device may be equally spaced, for example, with about 20 mm from center-to-center although other spacing arrangements may be provided in further examples. For instance, a different spacing arrangement of suction cups may be provided within each set of suction cups and/or the sets of suction cups may include different spacing configurations when compared to one another.

The suction cups 309 may comprise 10 mm nominal diameter suction cups although different sized suction cups may also be provided. As shown in FIG. 10, the outer engagement surface 1003 appears to comprise a planar ring although the outer engagement surface 1003 may simply comprise an edge, such as a rounded edge, in further examples. The suction cups 309 may also comprise a wide range of materials such as a silicon material or other material capable withstanding the operating conditions of the process.

Figure 5:
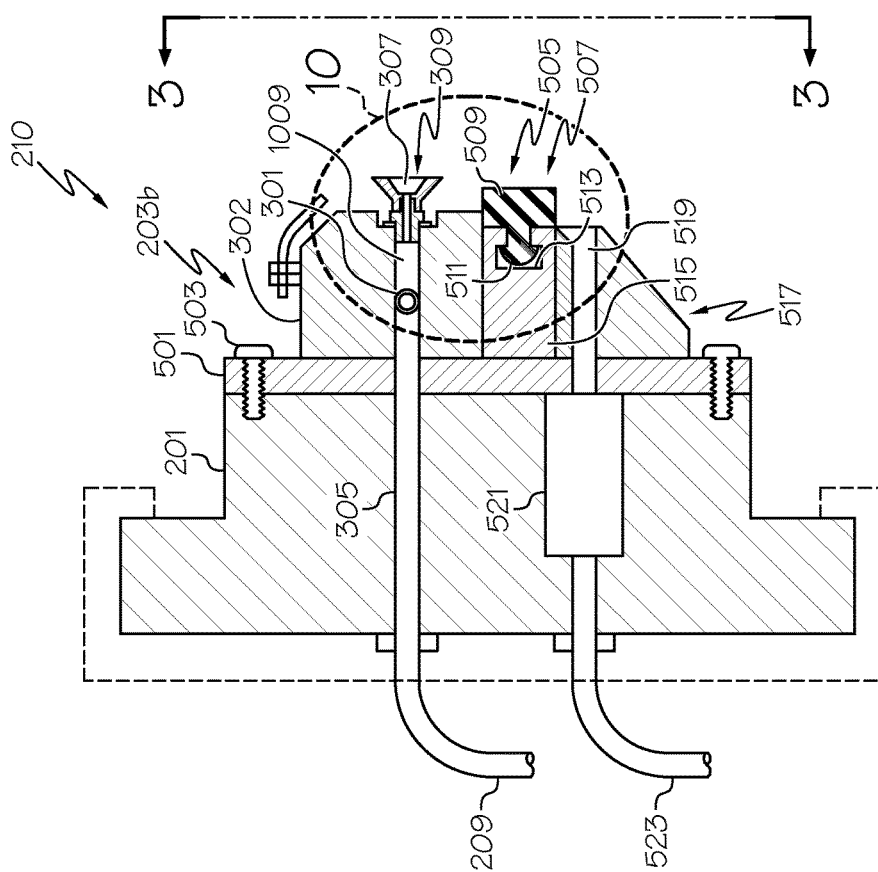
FIG. 5 is a schematic cross sectional view of the breaking device along line 5-5 of FIG. 3.

FIG. 5 is a schematic sectional view of the nosing member 203b along line 5-5 of FIG. 3. The nosing members 203a-g can be designed for independent installation to allow replacement of a defective nosing member without requiring replacement of the entire breaking device 210. For example, each nosing member 203a-g can include an interface part 501 carrying the suction cup support member 302 and other portions of the corresponding nosing member. Fasteners 503 permit removable mounting of each nosing member from the support base 201 by selectively fastening the corresponding interface part 501 to the support base 201.

The nosing member 203b may further include an anvil portion 505 with a compliant member 509 defining an engagement surface 507 configured to engage a major surface of the glass ribbon 140. In one example, the engagement surface 507 comprises a substantially planar surface although other surface features may be provided in further examples. The compliant member 509 can be mounted to the interface part 501 by an anvil base 515. Although not required in all examples, the compliant member may be removably mounted to the anvil base. For example, the anvil base 515 can include a mounting groove 513 configured to releasably receive a mounting tongue 511 of the compliant member 509. As such, the compliant member 509 may be easily removed for cleaning or replacement without disassembling the nosing member from the support base 201. Although not shown, adhesive may be provided a secure interface between the compliant member 509 and the anvil base 515.

The compliant member 509 and flexible portions of the suction cups 309 may comprise a wide range of resilient materials, such as silicon material (e.g., silicon rubber). The example compliant member 509 may be formed by extrusion, injection molding, or other manufacturing techniques.

Figure 11:
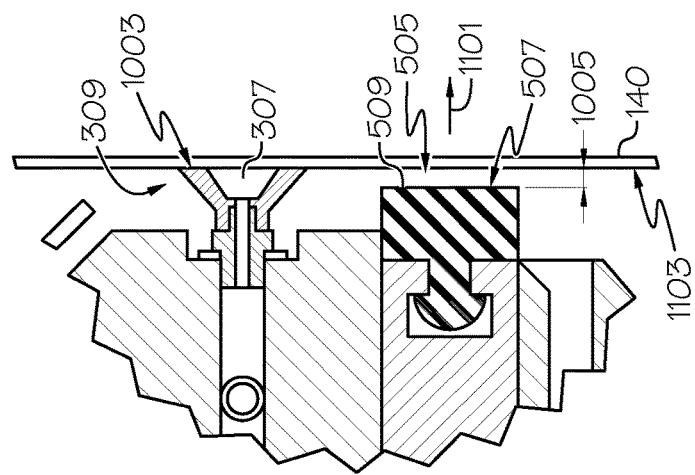
FIG. 11 illustrates engagement surfaces of a set of suction cups engaging a surface of a glass ribbon.

As shown in FIG. 10, a portion 1001 of each suction cup 309 extends beyond the engagement surface 507 of the anvil portion 505. For instance, as shown in FIG. 10, an engagement surface 1003 of the portion 1001 of each suction cup 309 can extend a distance 1005 within a range of about 0.5 mm to about 1 mm beyond the engagement surface 507 of the anvil portion 505. One or more washers 1106 may be provided to achieve the appropriate distance 1005. As shown in FIG. 11, the distance 1005 can be defined in a direction 1101 that can be perpendicular to the engagement surface 507 of the anvil portion 505. In addition or alternatively, as shown in FIG. 11, the direction 1101 can extend substantially perpendicular to a major surface 1103 of the glass ribbon 140 when the major surface 1103 of the glass ribbon 140 first touches the engagement surface 1003 of the portion 1001 of each suction cup 309.

Figure 12:
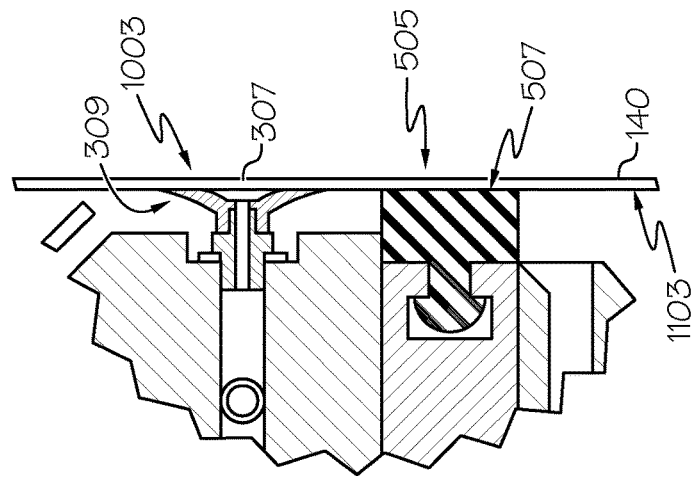
FIG. 12 illustrates each suction cup of the set of suction cups collapsed such the engagement surface of the suction cups are co-planar with the engagement surface of the anvil portion.

As shown in FIG. 12, the suction cups 309 are configured such that after the engagement surface 1003 of the suction cup 309 is engaged with the major surface 1103 of the glass ribbon 140, the suction area 307 of each suction cup 309 may be at least partially evacuated by operation of the corresponding pressure zone to draw the glass ribbon 140 against the engagement surface 507 of the anvil portion 505. Indeed, as further shown in FIG. 12, the portion 1001 of the suction cup 309 is configured to collapse such that the engagement surface 1003 of each suction cup 309 is substantially coplanar with the engagement surface 507 of the anvil portion 505. For instance, the portion 1001 of each suction cup can be configured to collapse such that the engagement surface 1003 of the suction cup retracts the distance 1005, e.g., within the range of about 0.5 mm to about 1 mm, to be substantially coplanar with the engagement surface 507 of the anvil portion 505.

As further shown in FIG. 5, the nosing member 203b may further include a chip vacuum device 517 that may define a vacuum slot 519 in communication with a cup vacuum plenum 521 defined in the support base 201. The vacuum plenum 521 may provide communication with all of the vacuum slots 519 of the nosing members 203a-g such that one or more vacuum sources 523 may operate together to remove chips from the vicinity of the glass ribbon 140 and/or the glass sheets 152 being broken away from the glass ribbon 140.

The support base 201, the interface part 501, suction cup support member 302, anvil base 515 and chip vacuum device 517 may comprise substantially rigid materials such as various metals (e.g., steel), plastics, resins, composites or other materials.

Methods of producing the glass sheet 152 will now be described. For example, as shown in FIG. 1, the fusion draw machine 112 receives molten glass through the inlet 114. The molten glass is then received in a trough 116 of the forming vessel 118. The molten glass eventually spills over the trough 116 and flows down in the draw direction 128 along opposite sides of the forming wedge 120. The molten glass continues to flow down the opposite sides of the forming wedge 120 until they encounter the root 122 of the forming wedge 120. The molten glass is then fusion drawn as the glass ribbon 140 along the draw direction 128 into a viscous zone 156 downstream from the root 122 of the forming wedge 120.

As shown, the glass ribbon 140 includes a lateral portion 142 extending between opposed edges 144*a*, 144*b* along a lateral direction indicated by the double arrow 146. As shown, the lateral direction 146 can extend substantially perpendicular to the draw direction 128 in the direction of the width of the glass ribbon 140. In further examples, the lateral direction 146 may extend at an angle with respect to the draw direction 128.

The glass ribbon 140 can have a substantially straight or a substantially curved cross-sectional profile in a direction of the width of the glass ribbon. For example, as shown in FIG. 6, the glass ribbon 140 may have a substantially curved cross-sectional profile in the direction of the width.

A substantially curved cross-sectional profile can be achieved with a wide variety of techniques. For instance, as shown the root 122 of the forming wedge 120 can be curved or otherwise configured to induce the curved cross-sectional profile in the viscous zone. In further examples, the curved cross-sectional profile may be achieved by way using air jets and/or vacuums as disclosed in U.S. Pat. Pub. No. 2008/0131651 that is herein incorporated by reference in its entirety.

Referring back to FIG. 1, the glass ribbon 140 may then travel along draw direction 128 into a setting zone 158 downstream from the viscous zone 156. In the setting zone 158, the glass ribbon is set from a viscous state to an elastic state with the desired cross-sectional profile. Once the glass ribbon is set in the elastic state, the profile of the glass ribbon in the viscous zone 156 is frozen as a characteristic of the ribbon. The profile of the glass ribbon in the viscous zone 156 is carried through to the setting zone 158. Thus, as shown, the substantially curved cross-sectional profile may be carried through from the viscous zone 156 to the setting zone 158 wherein the profile is frozen as a characteristic of the ribbon. While the set ribbon may be flexed away from this configuration, internal stresses will cause the glass ribbon to bias back to the original set profile and, in extreme cases, may cause the ribbon to overextend into a different orientation.

As further shown, the same substantially curved cross-sectional profile from the viscous zone 156 and the setting zone 158 can be carried through to the elastic zone 160. In fact, as shown, throughout each of the zones 156, 158, 160, the glass ribbon 140 may have substantially the same cross-sectional profile in a direction of the width of the glass ribbon 140. In further examples, the glass ribbon 140 may be curved to different degrees or may even have different curvatures throughout the elastic zone 160. Thus, the substantially curved cross-sectional profile can exist substantially continuously through each of the zones 156, 158, 160 wherein, as shown in FIG. 6, the first major surface 1103 of the glass ribbon 140 includes a concave surface and a second major surface 601 of the glass ribbon 140 includes a convex surface.

As mentioned previously, the glass ribbon 140 may include other profile configurations such as a substantially straight cross sectional profile that can extend continuously through each of the zones 156, 158, 160. Thus, the root 122 of the forming wedge 120 may be substantially straight or otherwise configured to form a substantially flat ribbon in the viscous zone 156. In still further examples, the glass ribbon 140 may have different cross-sectional profiles. For example, the glass ribbon may be formed with the first major surface 1103 including a convex surface and the second major surface 601 comprising a concave surface. As shown, the cross-sectional profile may comprise a single curve although further profiles may have a sinusoidal curve or other curvilinear shape. Still further, the cross-sectional profile may change as it travels in the draw direction 128. For example, one or more different profiles may exist in the viscous zone 156, the setting zone 158 and or the elastic zone 160. For example, one or more straight, single curve, sinusoidal curve or other shape may exist at various locations along the draw direction 128 of the glass ribbon 140.

As further illustrated in FIG. 1, a pull roll assembly 126 may be provided to facilitate drawing of the glass ribbon 140 from the root 122 in the draw direction 128. As such, the draw rate, thickness and other characteristics of the glass ribbon 140 can be controlled.

Optionally, as shown in FIG. 1, a region of the glass within the elastic zone 160 may be stabilized by way of the stabilization device 130. As shown, the stabilization device 130 is separate from the breaking device 210 although the stabilization device 130 and the breaking device 210 may be provided as a single device in further examples. Moreover, as shown, the stabilization device 130 is located immediately upstream of the breaking device 210 although the stabilization device 130 may be provided in one or more other locations in further examples. For instance, the stabilization device 130 may be located further upstream within the elastic zone 160. Still further, a plurality of stabilization devices 130 may be provided at various locations along the elastic zone 160. For instance, two or more stabilization devices 130 may be provided at spaced locations along the elastic zone 160.

Once the glass ribbon 140 is drawn sufficiently within the elastic zone 160, the glass sheet 152 may be broken away from the end of the glass ribbon 140. The breaking device 210 may be manually or automatically adjusted to the appropriate position with respect to the lateral portion 142 of the glass ribbon 140. For example, the computer controller 217 may obtain feedback from the one or more proximity sensors 227. Based on the feedback from the sensors, the computer controller 217 may command the actuator 225 to appropriately position the breaking device 210 with respect to the glass ribbon 140.

As shown in FIG. 6, for example, the breaking device 210 may be positioned with respect to the glass ribbon 140 to be adjacent first major surface 1103 (e.g., concave side) of the glass ribbon 140 along the lateral portion 142. A vacuum may be created by one or more pressure zones. For instance, as shown, the plurality of pressure zones 205*a-g* may be spaced along the width of the breaking device 210. In the schematic illustration the plurality of pressure zones includes a central pressure zone 205*d* straddled by a first pair of pressure zones 205*c*,205*e* and sequentially straddled by a second pair 205*b*, 205*f* and third pair 205*a*, 205*g* of pressure zones. While seven pressure zones are illustrated, more or less pressure zones may be provided in further examples. As discussed with respect to FIG. 2 above, in the illustrated example, the pressure zones 205a-g may each be provided with the corresponding set of suction cups 231a-g. The fluid control manifold 211 may operate to place the pressure zones 205a-g in selective communication with one or both of the positive pressure source 213 or negative pressure source 215 such that each set of suction cups 231a-g may selectively provide a corresponding positive pressure zone or vacuum zone having various pressure magnitudes.

The method can further include the step of creating a vacuum to force the entire lateral portion 142 of the glass ribbon 140 to engage the anvil portion 505 of the breaking device 210 in the elastic zone 160. The vacuum force provided by the pressure zones 205a-g can be operated independent from one another to likewise operate the corresponding sets of suction cups 231a-g independent from one another to draw the lateral portion 142 of the glass ribbon 140 to engage the anvil portion 505.

In one example, the pressure zones are operated independent from one another as the glass ribbon engages the anvil portion. Independent operation, either in sequence or otherwise, can control the process of flattening out the glass ribbon 140 against the anvil portion 505. For example, one or more of the outermost pressure zones may be operated at a significantly higher vacuum to bring at least one of the side portions 145a, 145b in contact with the anvil portion 505. For example, as shown in FIG. 6, the outer pair of pressure zones 205a, 205g has a significantly greater vacuum than the central pressure zone 205d and remaining pressure zones. As such, the vacuum provided by the negative pressure source 215 may be focused on the outermost pair of pressure zones 205a, 205g to draw the side portions 145a, 145b into contact with the anvil portion 505. Then the next pair of pressure zones 205b, 205f may be operated, in sequence, to provide a relatively high suction compared to the remaining pressure zones. This sequential process can continue until the entire lateral portion 142 is engaged with the engagement surface 507 of the anvil portion 505. Sequentially adjusting the vacuum pressure from the sides of the anvil portion 505 toward the center of the anvil portion 505 can prevent snapping of the ribbon against the anvil portion 505 that may otherwise generate vibrations that can propagate upstream through the glass ribbon 140 into the setting zone 158.

Alternatively, a pressing device may be used to flatten out the lateral portion of the glass ribbon against the anvil portion. The pressing device may comprise a pressing bar, or other contact mechanism. In the illustrated example shown in FIG. 7, the pressing device comprises a roller device 701 including a series of rollers 703 configured to roll across the second major surface 601 of the glass ribbon 140 along linear direction 705. As the roller presses the glass sheet against the anvil portion, the vacuum thereafter prevents the glass ribbon 140 from returning to the nonlinear profile before breaking away the glass sheet 152 from the glass ribbon 140 as discussed more fully below. Moreover, the pressure zones may operate sequentially in concert with the pressing device such that the entire lateral portion 142 of the glass ribbon 140 is engaged with the anvil portion 505. For instance, as illustrated in FIG. 6 by the arrows of the pressure sensors 229a-g, a relatively weak pressure zone can be initially provided. Turning to FIG. 7, as indicated by the arrows of the pressure sensors 229a-d, once the pressing device begins flattening out the glass ribbon 140, the vacuum of the pressure zones may be sequentially increased to firmly hold the flattened extent of the lateral portion 142 against the engagement surface 507. As indicated by the arrow of pressure sensor 229e, the vacuum of the pressure zone in front of the pressing member may also be increased to help pull the glass ribbon against the anvil portion 505 before being flattened by the rollers 703. As such, vibrations can be avoided that might otherwise result from snapping of the glass ribbon 140 against the anvil portion 505. Once fully engaged, as indicated by the arrows of pressure sensors 229a-g in FIG. 8, the vacuum of all of the pressure zones can be increased to help firmly hold the entire lateral portion 142 against the engagement surface 507. Individual and/or sequential control of the vacuum zones can reduce vibrations from propagating up the ribbon to the setting zone 158 where internal stresses and/or shape variabilities may be frozen into the glass ribbon. Moreover, providing the anvil portion 505 with a compliant member 509 comprising a resilient material (e.g., silicon rubber) can further help absorb vibrations from the process of engaging the lateral portion of the glass ribbon with the anvil portion of the breaking device.

Figure 9:
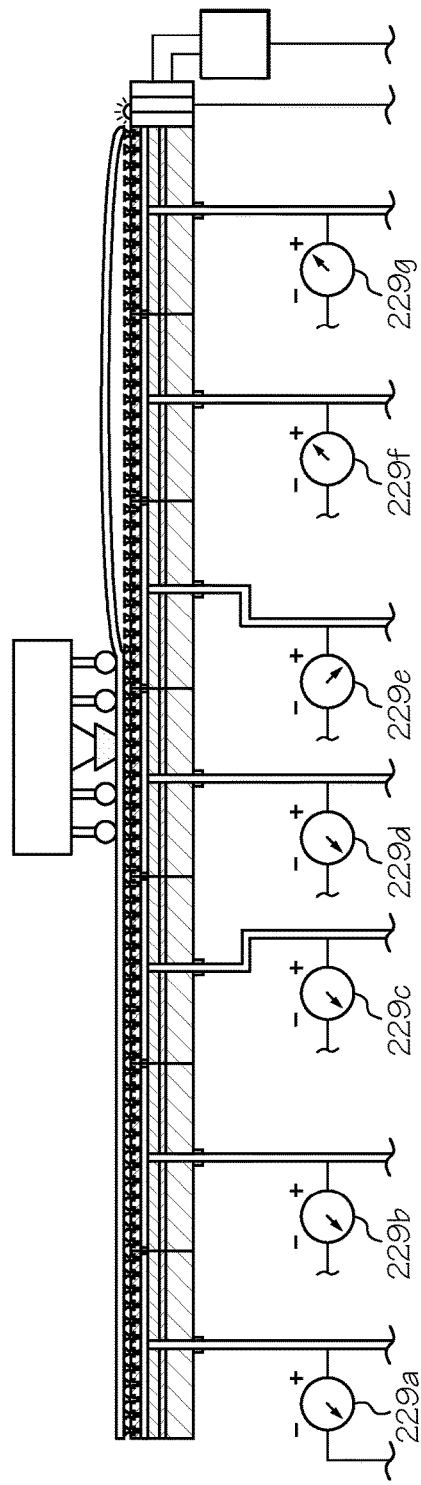
FIG. 9 is another example of the lateral portion of the glass ribbon being flattened out with a pressing device.

In further examples, the pressure zones may operate at a positive pressure as the lateral portion 142 is engaged with the anvil portion 505. Indeed, as indicated by the arrows of pressure sensor 229e in FIG. 9, the pressure zone may operate at a maximum pressure just prior to engagement by the roller to help prevent snapping. Once engaged, the pressure zone can be operated at a significant vacuum as indicated by pressure sensors 229a-d. Pressure zones further away from the pressing member may be operated at a reduced compressed air (see 229f-g) and may even operate with a slight vacuum.

Figure 8:
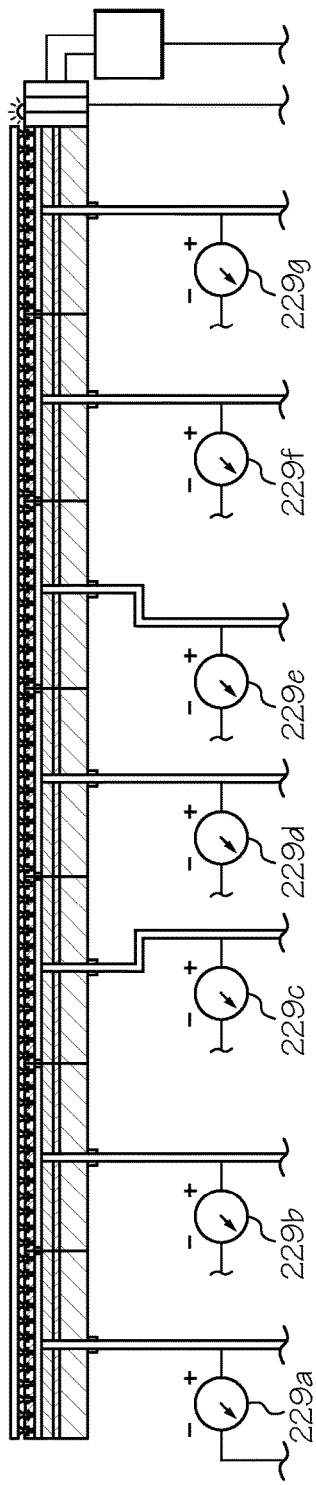
FIG. 8 is a schematic view of a vacuum holding the lateral portion of the glass ribbon along a substantially straight cross-sectional profile.

As shown in FIG. 8, the lateral portion 142 may be flattened out to maintain a linear profile. A linear profile can be achieved by providing the illustrated planar engagement surface 507. It will be appreciated that other non-planar engagement surfaces may be provided in further examples.

The method may further include the step of forming a score line along the lateral portion 142 of the glass ribbon 140 in the elastic zone 160. The score line comprise a continuous score line extending between the side portions 145a, 145b although the score line may comprise a dashed score line, perforated line or other score configuration. Various scoring devices may be used in accordance with aspects of the present disclosure. For example, scoring devices may comprise laser devices, mechanical scoring devices and/or devices to otherwise score the glass ribbon. Referring to FIG. 7, the scoring device 707 comprises a diamond point scriber or diamond wheel scriber although other scoring structures may be used in further examples.

The scoring process may be initiated after the entire lateral portion 142 is forced to engage the anvil portion 505 by the vacuum. Alternatively, as shown in FIG. 7, the step of forming the score line with the scoring device 707 is initiated before the entire lateral portion 142 of the glass ribbon 140 engages the anvil portion 505. Such a procedure may reduce overall processing time to increase manufacturing efficiency.

Figure 13:
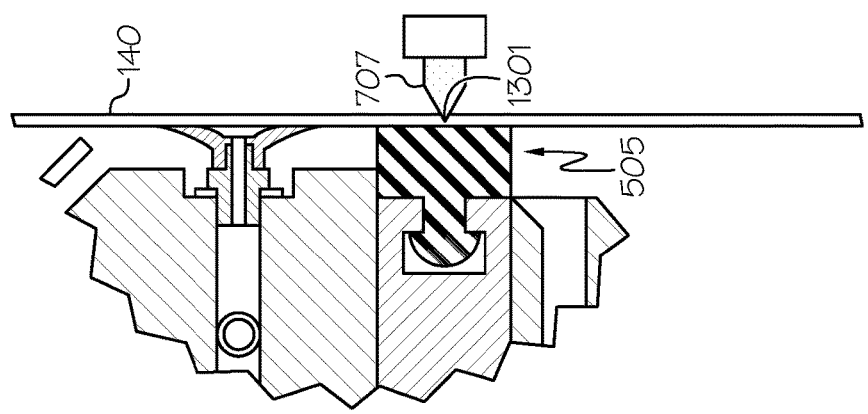
FIG. 13 illustrates the step of forming a score line along the lateral portion of the glass ribbon of FIG. 12.

FIGS. 13-16 schematically illustrate methods steps of forming a score line 1301 along the lateral portion 142 of the glass ribbon 140 and breaking away the glass sheet 152 from the glass ribbon 140 along the score line 1301 while the entire lateral portion 142 is forced against the anvil portion 505 by the vacuum. As shown in FIG. 13, the scoring device 707 forms a score line 1301 within the glass ribbon 140 such that the pressure zones 205a-g are positioned at a higher elevation with respect to the score line 1301. After scoring, the entire lateral portion 142 of the glass ribbon is flattened against the anvil portion 505, wherein the vacuum thereafter prevents the glass ribbon 140 from returning to the nonlinear profile before breaking away the glass sheet 152 from the glass ribbon 140.

Figure 14:
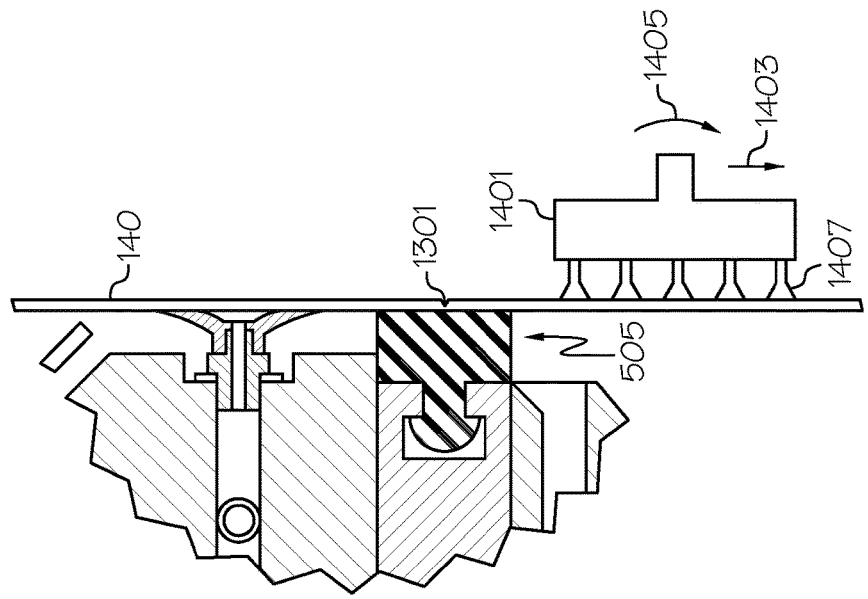
FIG. 14 is a cross sectional view similar to FIG. 13 wherein suction member engages a portion of the glass ribbon below the score line.

As shown in FIG. 14, a gripping device 1401 may then grip the segregated portion of the glass ribbon below the score line 1301, for example, adjacent the opposed edges 144a, 144b of the glass ribbon 140. Next, the gripping device 1401 may be pulled downward along direction 1403 and/or rotated about direction 1405 to allow the glass sheet to break away from the glass ribbon along the score line while the entire lateral portion is forced against the anvil portion by the vacuum. A wide range of gripping devices may be used in accordance with aspects of the disclosure. In the illustrated example, the gripping device 1401 may comprise a suction carriage with a vertical column of suction members 1407 designed to only grip the outer edges portions of the glass ribbon 140.

Figure 15:
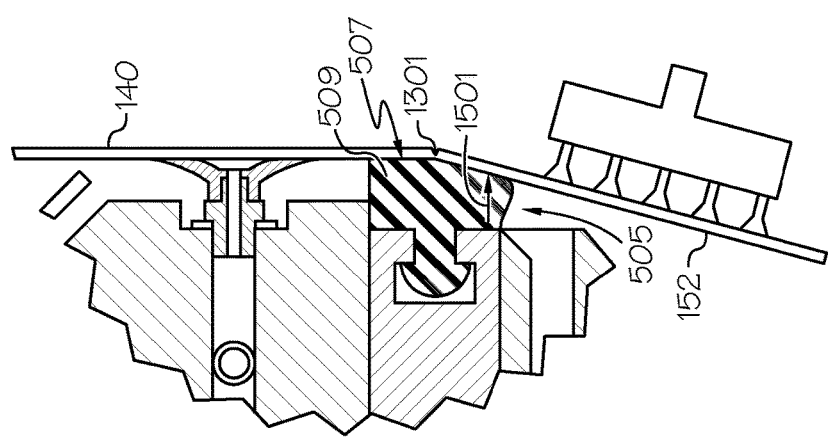
FIG. 15 is a cross sectional view similar to FIG. 14 wherein the suction member begins breaking away the glass sheet from the glass ribbon along the score line.

FIG. 15 illustrates rotation of the glass sheet 152 about the score line 1301 while the lateral portion 142 is firmly held against the engagement surface 507 by the vacuum. Firmly holding the lateral portion 142 against the engagement surface 507 can increase stress concentrations at the score line 1301 during the breaking process. As such, a reduced break angle of the glass sheet 152 with respect to the glass ribbon 140 and/or reduced forces may be necessary to break away the glass sheet 152 from the glass ribbon 140. For example, the downward force along direction 1403 and/or the rotational moment about direction 1405 may be reduced while still achieving separation of the glass sheet 152 from the glass ribbon 140. Reduction in the breaking angle and/or breaking forces can prevent instabilities from traveling upstream through the glass ribbon 140 to the setting zone 158 and/or viscous zone 156. Moreover, the lower edge of the compliant member 509 can compress and provide a reaction force indicated at arrow 1501 that may further facilitate cracking along the score line 1301 without damaging the upper portion of the glass sheet 152 in the process.

Figure 16:
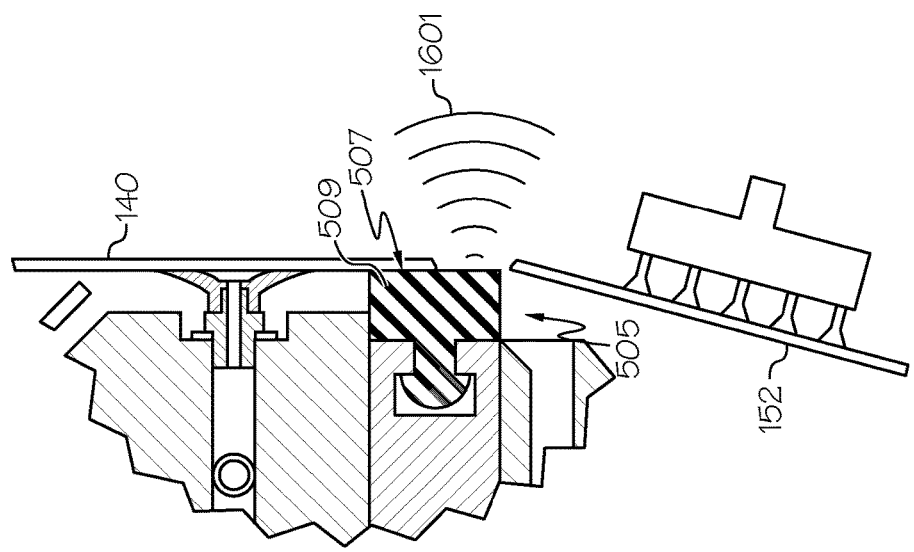
FIG. 16 is a cross sectional view similar to FIG. 15 wherein the suction member has completed the process of breaking away the glass sheet from the glass ribbon.

FIG. 16 illustrates the glass sheet 152 broken away from the glass ribbon 140 wherein the resilient compliant member 509 may absorb vibrations 1601, thereby preventing the vibrations from propagating up through the glass ribbon. If provided, the stabilization device 130 may further reduce any consequences from any vibrations that are not absorbed by the compliant member 509.

Once broken away, the lateral portion 142 of the glass ribbon 140 remains firmly held against the engagement surface 507. A controlled release of the lateral portion 142 from the engagement surface 264 may then be performed to help disengage the lateral portion from the engagement surface while preventing swinging of the glass ribbon or prevent vibrations from propagating up the glass ribbon. Moreover, controlled releasing can help prevent the glass ribbon from uncontrollably popping back the original curved configuration. Uncontrollable popping may cause the glass ribbon to pop into an undesirable configuration and/or generate vibrations that may propagate up the glass ribbon to the setting zone 158 and/or viscous zone 156. For instance, the vacuum force from the central pressure zone may be reduced to begin releasing the central area of the lateral portion before side pressure zones begin releasing side areas of the lateral portion.

FIGS. 17-18 illustrate one method of releasing the lateral portion 142 from the engagement surface 507. As indicated by pressure sensor 229d in FIG. 17, the vacuum associated with the central pressure zone 205d may be reduced before reducing the vacuum associated with the remaining pressure zones. As such, the central area of the lateral portion 142 begins retaining its original shape while the remainder of the lateral portion 142 remains firmly held against the engagement surface 507. As shown in FIG. 18, the vacuum associated with the pair of pressure zones 205c, 205e is then sequentially reduced such that further portions of the lateral portion 142 continue to gradually return to the original profile shape. The process can be continued sequentially through the remaining pressure zones until the original shape illustrated in FIG. 6 is achieved. Controlling the release of the lateral portion can help prevent vibrations and/or popping of the glass ribbon into different higher energy profile shapes.

FIGS. 19-20 illustrate another example of the vacuum force from the central pressure zone being reduced to begin the releasing process. Indeed, as shown, the vacuum force may be completely eliminated and replaced with the positive pressure. FIG. 19 demonstrates the central pressure zone 205d including a positive pressure forcing the central area of the lateral portion 142 away from the engagement surface 507 while the remaining pressure zones provide the vacuum force to prevent full disengagement. As shown in FIG. 20, the pair of pressure zones 229c, 229e is then sequentially switched from a vacuum to a positive pressure configuration to continue disengagement of the lateral portion 142 from the engagement surface 507. The process can be continued sequentially through the remaining pressure zones until the original shape illustrated in FIG. 6 is achieved.

As such, each of the pressure zones 205a-g may be provided with a respective pressure sensor 229a-g that may each send feedback to the computer controller 217 to facilitate automatic adjustment of the pressure of each pressure zone 205a-g to the desired preselected pressure by way of the fluid control manifold 217. Moreover, the method may include the optional step of monitoring a condition of the pressure zones, and performing maintenance on the breaking device based on the monitored condition. For example, the computer controller 217 can monitor the pressure within the pressure zones 205a-g with the pressure sensors 229a-g. Leaks from a faulty suction cup 309 may be detected based on pressure loss within the pressure zones 205a-g. As such, the computer can determine which pressure zone is affected to indicate possible cleaning or replacement of the suction cups within that pressure zone.

As shown, the entire breaking away process may be carried out by a traveling anvil machine. Indeed, as shown in FIGS. 13-16, the anvil portion 505 may travel together with the glass ribbon 140 in the draw direction 128 so there is substantially no relative vertical movement of the anvil portion 505 with respect to the glass ribbon 140.

The present disclosure provides individual suction cups 309 that provides a more effective vacuum engagement since a tighter seal may be achieved. Indeed, collapsing of the vacuum cup ensures a proper abutment of the glass ribbon with respect to the anvil portion to provide secure pulling of the glass ribbon against the anvil portion. Individual suction cups also provides a flexible process configuration since the ability to remove selected suction cups and replace with a plug allows a quick change in process configuration to accommodate different glass ribbon widths and/or allow simplified and unique customization of suction cup pattern to achieve a desired pressure profile. Providing a plurality of suction cups further reduces process time since more secure and firm forcing of the glass ribbon against the anvil portion reduces the time to break the glass sheets from the glass ribbon.

It will be apparent to those skilled in the art that various modifications and variations can be made without departing from the spirit and scope of the claimed invention.

What is claimed is:

1. A method of producing a glass sheet comprising the steps of:
   (I) fusion drawing a glass ribbon along a draw direction into a viscous zone downstream from a root of a forming wedge, wherein the glass ribbon includes opposed edges and a lateral portion extending between the opposed edges along a lateral direction transverse to the draw direction;
   (II) drawing the glass ribbon into a setting zone downstream from the viscous zone, wherein the glass ribbon is set from a viscous state to an elastic state;
   (III) drawing the glass ribbon into an elastic zone downstream from the setting zone;
   (IV) creating a vacuum to force the entire lateral portion of the glass ribbon to engage an anvil portion of a breaking device in the elastic zone, wherein the vacuum is provided by a plurality of pressure zones that are operated independent from one another, wherein each pressure zone is provided with a set of suction cups located upstream from the anvil portion along the draw direction, and wherein a suction area of each suction cup is in fluid communication with the corresponding pressure zone;
   (V) forming a score line along the lateral portion of the glass ribbon in the elastic zone; and
   (VI) breaking away a glass sheet from the glass ribbon along the score line while the entire lateral portion is forced against the anvil portion by the vacuum.

2. The method of claim 1, wherein, the plurality of pressure zones includes at least one central pressure zone straddled by at least one pair of side pressure zones, wherein, after the step of breaking away the glass sheet, the vacuum force from the central pressure zone is reduced to begin releasing a central area of the lateral portion before the pair of side pressure zones begins releasing side areas of the lateral portion.

3. The method of claim 2, wherein, after the step of breaking away the glass sheet, a positive pressure is applied by the central pressure zone to force the central area away from the anvil portion.

4. The method of claim 3, wherein, the positive pressure is applied by the central pressure zone while the vacuum is maintained by the pair of side pressure zones.

5. The method of claim 1, wherein the plurality of pressure zones are adjusted independently as the glass ribbon engages the anvil portion.

6. The method of claim 5, wherein the plurality of pressure zones are adjusted sequentially as the glass ribbon engages the anvil portion.

7. The method of claim 1, further comprising the steps of setting the glass ribbon with a nonlinear profile in the lateral direction, and using a pressing device to flatten out the lateral portion of the glass ribbon against the anvil portion, wherein the vacuum thereafter prevents the glass ribbon from returning to the nonlinear profile before breaking away the glass sheet from the glass ribbon.

8. The method of claim 1, wherein the step of forming the score line is initiated before the entire lateral portion of the glass ribbon engages the anvil portion.

9. The method of claim 1, further comprising the step of setting the glass ribbon with a substantially curved cross-sectional profile in the lateral direction.

10. The method of claim 1, wherein the vacuum holds the lateral portion of the glass ribbon along a substantially straight cross-sectional profile against the anvil portion prior to breaking away the glass sheet from the glass ribbon along the score line.

11. The method of claim 1, wherein the breaking device comprises a traveling anvil machine wherein the anvil portion moves together with the lateral portion in the draw direction while maintaining the vacuum.

12. The method of claim 1, further comprising the step of monitoring a condition of the pressure zones, and performing maintenance on the breaking device based on the monitored condition.

13. The method of claim 1, wherein during step (IV), a portion of each suction cup collapses such that an engagement surface of the suction cup is coplanar with an engagement surface of the anvil portion.

14. The method of claim 13, wherein during step (IV), the portion of each suction cup collapses such that the engagement surface of the suction cup retracts a distance within a range of about 0.5 mm to about 1 mm to be coplanar with the engagement surface of the anvil portion.

15. The method of claim 1, wherein the plurality of pressure zones are in fluid communication with a negative pressure source, and wherein the suction cups engage a surface of the glass ribbon with the suction area of each suction cup being at least partially evacuated by operation of the negative pressure source to draw the glass ribbon against the anvil portion.

16. The method of claim 1, wherein a portion of each suction cup extends beyond the engagement surface of the anvil portion.

17. The method of claim 16, wherein the portion of each suction cup comprises an engagement surface of the suction cup that extends a distance within a range of about 0.5 mm to about 1 mm beyond the engagement surface of the anvil portion.

18. A method of producing a glass sheet comprising the steps of:
   (I) fusion drawing a glass ribbon along a draw direction into a viscous zone downstream from a root of a forming wedge, wherein the glass ribbon includes opposed edges and a lateral portion extending between the opposed edges along a lateral direction transverse to the draw direction;
   (II) drawing the glass ribbon into a setting zone downstream from the viscous zone, wherein the glass ribbon is set from a viscous state to an elastic state;
   (III) drawing the glass ribbon into an elastic zone downstream from the setting zone, wherein the lateral portion of the glass ribbon includes a profile shape along the lateral direction comprising a set profile shape;
   (IV) creating a vacuum to force the entire lateral portion of the glass ribbon to engage an anvil portion of a breaking device in the elastic zone, wherein the glass ribbon is held such that the profile shape of the lateral portion of the glass ribbon comprises an engaged profile shape that substantially matches a shape of the anvil portion and is substantially different than the set profile shape, and wherein the vacuum is provided by a plurality of pressure zones that are operated independent from one another, wherein each pressure zone is provided with a set of suction cups located upstream from the anvil portion along the draw direction, and wherein a suction area of each suction cup is in fluid communication with the corresponding pressure zone;

(V) forming a score line along the lateral portion of the glass ribbon;

(VI) breaking away a glass sheet from the glass ribbon along the score line while the entire lateral portion is forced against the anvil portion by the vacuum; and then (VII) releasing the glass sheet from the anvil portion such that the profile shape of the glass ribbon does not match the engaged profile shape.

19. The method of claim 18, wherein during step (IV), a portion of each suction cup collapses such that an engagement surface of the suction cup is coplanar with an engagement surface of the anvil portion.

20. The method of claim 19, wherein during step (IV), the portion of each suction cup collapses such that the engagement surface of the suction cup retracts a distance within a range of about 0.5 mm to about 1 mm to be coplanar with the engagement surface of the anvil portion.

21. The method of claim 18, wherein the plurality of pressure zones are in fluid communication with a negative pressure source, and wherein the suction cups engage a surface of the glass ribbon with the suction area of each suction cup being at least partially evacuated by operation of the negative pressure source to draw the glass ribbon against the anvil portion.

22. The method of claim 18, wherein a portion of each suction cup extends beyond the engagement surface of the anvil portion.

23. The method of claim 22, wherein the portion of each suction cup comprises an engagement surface of the suction cup that extends a distance within a range of about 0.5 mm to about 1 mm beyond the engagement surface of the anvil portion.

* * * * *